(12) United States Patent
Kusuda (10) Patent No.: US 10,447,980 B2
(45) Date of Patent: Oct. 15, 2019

(54) IMAGE DISPLAY APPARATUS, CONTROL METHOD FOR IMAGE DISPLAY APPARATUS AND STORAGE MEDIUM FOR IMAGE QUALITY ADJUSTMENT

(71) Applicant: CANON KABUSHIKI KAISHA, Tokyo (JP)

(72) Inventor: Teruya Kusuda, Sakura (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/891,098

(22) Filed: Feb. 7, 2018

(65) Prior Publication Data

US 2018/0167592 A1  Jun. 14, 2018

Related U.S. Application Data

(62) Division of application No. 14/923,231, filed on Oct. 26, 2015, now Pat. No. 9,924,145.

(30) Foreign Application Priority Data

Oct. 28, 2014  (JP) ................. 2014-219764

(51) Int. Cl.
*H04N 9/31* (2006.01)
*G09G 3/00* (2006.01)

(52) U.S. Cl.
CPC ........... *H04N 9/3179* (2013.01); *G09G 3/002* (2013.01); *G09G 2320/0606* (2013.01); *G09G 2320/08* (2013.01)

(58) Field of Classification Search
CPC .... H04N 9/3179; H04N 9/43; H04N 1/00183; H04N 1/00408; H04N 2005/44539;
(Continued)

(56) References Cited

U.S. PATENT DOCUMENTS 6,639,628 B1 * 10/2003 Lee ..................... H04N 9/735
345/603
8,484,564 B1 * 7/2013 Marti .................... G06Q 50/01
463/42

(Continued)

FOREIGN PATENT DOCUMENTS

JP  2003-284705 A  10/2003
JP  2004-080549 A  3/2004
(Continued)

Primary Examiner — Jefferey F Harold
Assistant Examiner — Mustafizur Rahman
(74) Attorney, Agent, or Firm — Canon U.S.A., Inc. IP Division (57) ABSTRACT

An image display apparatus that enables easy setting of an adjustment parameter of an image quality setting item according to user preference includes an adjustment unit configured to adjust a display image based on an adjustment parameter, a display unit configured to generate a plurality of adjustment parameter candidates different from each other and display a list of a plurality of adjusted images adjusted by the adjustment unit based on the plurality of adjustment parameter candidates, and a selection unit configured to select an adjusted image from the displayed list. The adjustment parameter is set based on the adjusted image selected from the plurality of adjusted images and the plurality of adjustment parameter candidates when displaying an image.

10 Claims, 8 Drawing Sheets

(58) Field of Classification Search
CPC .... H04N 13/00; H04N 13/183; H04N 13/307;
H04N 13/332; H04N 13/349; H04N
13/351; H04N 13/354; H04N 13/1587;
G09G 3/002; G09G 2320/0606; G09G
2320/08
USPC ... 348/222.1, 231.2, 231.3, 218.1, 177, 178,
348/179, 180, 184, 189, 136, 130, 92,
348/14.12, 552, 553, 564, 618, 662, 714,
348/719, 725, 739, 785, 827, 831;
345/173, 589, 590; 715/735, 811, 838,
715/840
See application file for complete search history.

(56) References Cited

U.S. PATENT DOCUMENTS

| | | | | |
|---|---|---|---|---|
| 2003/0234810 | A1* | 12/2003 | Gonsalves | G06F 3/04847 715/744 |
| 2005/0152004 | A1* | 7/2005 | Park | G06F 3/1204 358/1.18 |
| 2005/0195157 | A1* | 9/2005 | Kramer | G06F 3/04845 345/156 |
| 2007/0109598 | A1* | 5/2007 | Clark | G06F 17/30274 358/1.16 |
| 2010/0085316 | A1* | 4/2010 | Kim | G06F 1/1616 345/173 |
| 2011/0001808 | A1* | 1/2011 | Mentz | H04N 13/332 348/59 |
| 2011/0282686 | A1* | 11/2011 | Venon | G16H 80/00 705/3 |
| 2012/0321131 | A1* | 12/2012 | Kobayashi | H04N 1/00183 382/103 |
| 2013/0083006 | A1* | 4/2013 | Nam | H04N 13/111 345/419 |
| 2014/0104494 | A1* | 4/2014 | Begeja | H04N 5/44591 348/564 |
| 2014/0146179 | A1* | 5/2014 | Harada | H04N 1/0035 348/160 |
| 2014/0229310 | A1* | 8/2014 | Gudorf | G06Q 30/0601 705/26.1 |
| 2014/0293349 | A1* | 10/2014 | Murai | H04N 1/00408 358/1.15 |
| 2014/0365899 | A1* | 12/2014 | Hass | G06F 3/0622 715/735 |
| 2015/0070523 | A1* | 3/2015 | Chao | H04N 5/23216 348/218.1 |
| 2015/0146012 | A1* | 5/2015 | Shipley | H04L 65/80 348/177 |
| 2015/0205771 | A1* | 7/2015 | Sakata | G06F 16/958 715/234 |
| 2016/0054845 | A1* | 2/2016 | Takahashi | G06F 3/0488 345/173 |

FOREIGN PATENT DOCUMENTS

| | | |
|---|---|---|
| JP | 2005-223823 A | 8/2005 |
| JP | 2006-229480 A | 8/2006 |
| JP | 2006-314014 A | 11/2006 |
| JP | 2008-176103 A | 7/2008 |
| JP | 2011-13370 A | 1/2011 |
| JP | 2014-115311 A | 6/2014 |

* cited by examiner

```
SELECT ITEM YOU WOULD LIKE TO ADJUST.

☐ BRIGHTNESS
☐ CONTRAST
☐ SHARPNESS
☐ GAMMA CORRECTION
☐ COLOR INTENSITY
☐ COLOR BALANCE
☐ COLOR TEMPERATURE
```

IMAGE DISPLAY APPARATUS, CONTROL METHOD FOR IMAGE DISPLAY APPARATUS AND STORAGE MEDIUM FOR IMAGE QUALITY ADJUSTMENT

CROSS-REFERENCE TO RELATED APPLICATION

This application is a Divisional of U.S. application Ser. No. 14/923,231, filed Oct. 26, 2015, which claims priority of Japanese Patent Application No. 2014-219764, filed Oct. 28, 2014, which are hereby incorporated by reference herein in their entireties.

BACKGROUND OF THE INVENTION

Field of the Invention

The present invention relates to image display apparatuses, in particular, to image quality adjustment thereof.

Description of the Related Art

As an example of image display apparatuses, projectors that enable users to enjoy images on a large screen are known. A projector includes various image quality setting items. For example, brightness, contrast, color shading of an image can be adjusted according to a user preference. Further, some projectors include a plurality of image quality modes, which are each preset by a combination of adjustment parameters of the image quality setting items. A user can change the image quality mode, as necessary, according to an image to be viewed, whereby image quality settings suitable for a preference of the user can be realized.

Japanese Patent Application Laid-Open No. 2011-13370 discusses a conventional projector in which a list of images processed by preset image quality modes and a user selects an image quality mode by comparing the images.

The conventional technique discussed in Japanese Patent Application Laid-Open No. 2011-13370, however, has a problem that image quality settings are not always suitable for user preference because selection is only made from the image quality modes that are combinations of preset adjustment parameters of image quality setting items. Further, while, in many image display apparatuses, an adjustment parameter can be set for each image quality setting item from a menu screen, it may take a long time to set the adjustment parameters especially in a case where a large number of image quality setting items are included.

SUMMARY OF THE INVENTION

The present invention is directed to an image display apparatus that enables easy setting of an adjustment parameter according to a user preference.

According to an aspect of the present invention, an image display apparatus includes an adjustment unit configured to adjust a display image based on an adjustment parameter, a display unit configured to generate a plurality of adjustment parameter candidates different from each other and display a list of a plurality of adjusted images adjusted by the adjustment unit based on the plurality of adjustment parameter candidates, and a selection unit configured to select an adjusted image from the displayed list, wherein the adjustment parameter is set based on the adjusted image selected from the plurality of adjusted images and the plurality of adjustment parameter candidates when displaying an image.

Further features of the present invention will become apparent from the following description of exemplary embodiments with reference to the attached drawings.

DESCRIPTION OF THE EMBODIMENTS

Exemplary embodiments of the present invention will be described in detail below with reference to the drawings.

Figure 1:
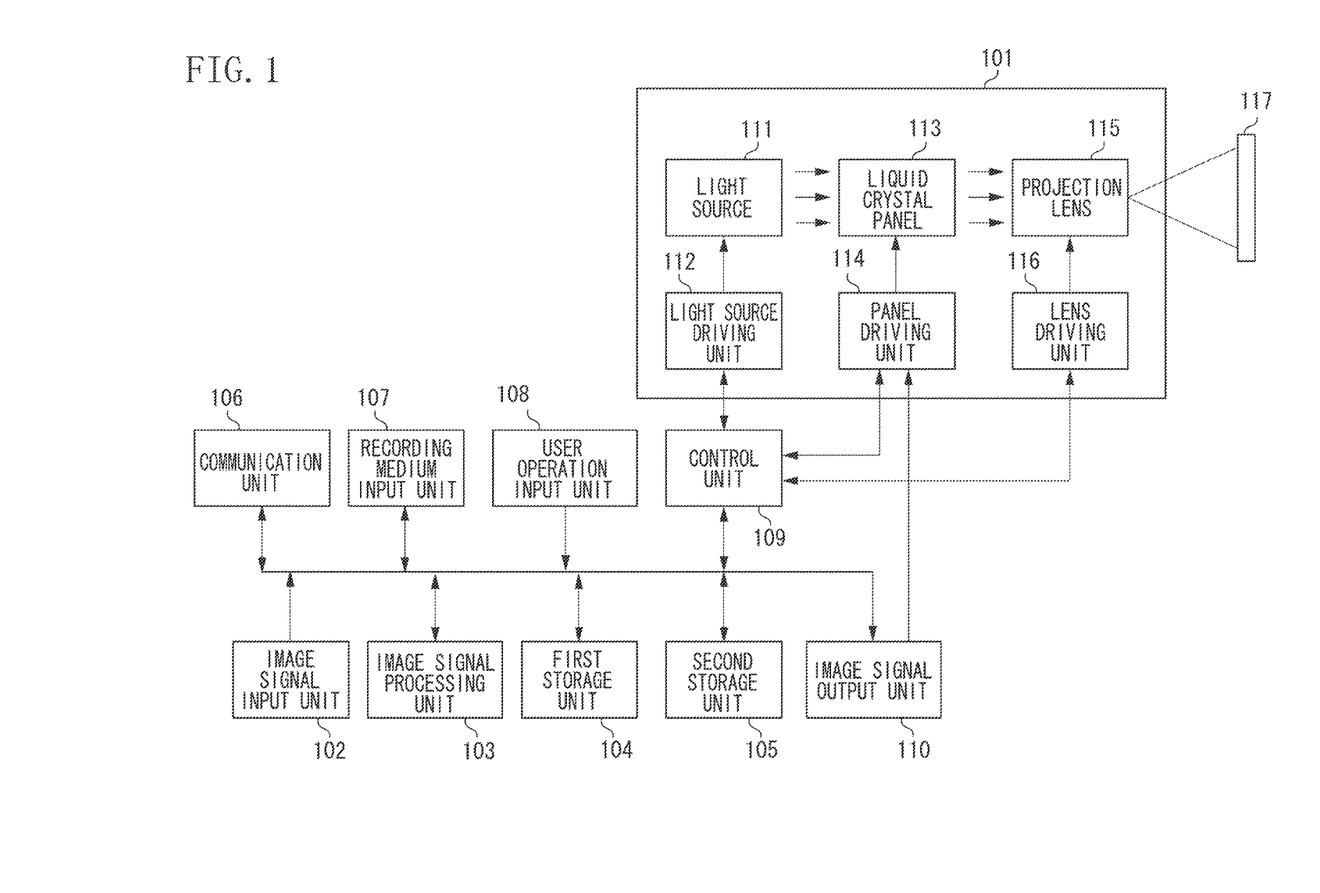
FIG. 1 is a schematic configuration diagram illustrating a projector apparatus according to an exemplary embodiment of the present invention.

FIG. 1 is a schematic configuration diagram illustrating a projector apparatus according to an exemplary embodiment of the present invention. The projector apparatus includes a projection unit 101, an image signal input unit 102, an image signal processing unit 103, a first storage unit 104, a second storage unit 105, a communication unit 106, a recording medium input unit 107, a user operation input unit 108, a control unit 109, and an image signal output unit 110.

The image signal input unit 102 inputs an external input image signal to the image signal processing unit 103 and the first storage unit 104 based on a control signal from the control unit 109.

The image signal processing unit 103 performs desired image quality processing on an image signal based on a control signal from the control unit 109. Examples of image quality processing include an adjustment of image quality such as brightness, contrast, color shading, and sharpness of an image and enlargement or reduction of an image size.

The first storage unit 104 mainly stores image signals input from the image signal input unit 102, image signals processed by the image signal processing unit 103, display images from the communication unit 106, and display images from the recording medium input unit 107.

The second storage unit 105 is a non-volatile memory that holds stored contents even when the power supply is off. The second storage unit 105 stores programs to be executed by the control unit 109, adjustment parameters of various types of processing of the image signal processing unit 103, image data from the communication unit 106, and image data from the recording medium input unit 107.

The communication unit 106 communicates with an external device based on a control signal from the control unit 109 by use of a communication method such as a wireless local area network (LAN), a wired LAN, and a universal serial bus (USB). The communication unit 106 can receive a control signal and input the received control signal to the control unit 109 and can also receive image data and input the received image data to the control unit 109, the image signal processing unit 103, the first storage unit 104, and the second storage unit 105.

The recording medium input unit 107 connects with a recording medium such as a non-volatile memory device and inputs image data recorded in the recording medium to the image signal processing unit 103, the first storage unit 104, and the second storage unit 105, based on a control signal from the control unit 109.

The user operation input unit 108 includes, for example, operation buttons for user operation input that are provided to a remote controller or a main body of the projector, and outputs an input user operation to the control unit 109.

The image signal output unit 110 supplies image signals processed by the image signal processing unit 103 and image signals stored in the first storage unit 104 to the panel driving unit 113 based on a control signal from the control unit 109.

The projection unit 101 includes a light source 111, a light source driving unit 112, a liquid crystal panel 113, a panel driving unit 114, a projection lens 115, and a lens driving unit 116.

The light source 111 is configured to output white light. For example, an extra high-pressure mercury lamp or a xenon lamp is used as the light source 111. The light source driving unit 112 controls the driving power to the light source 111 based on a control signal from the control unit 109, and turns on or off the light source 111. White light from the light source 111 is divided into green (hereinafter, "G") component light, red (hereinafter, "R") component light, and blue (hereinafter, "B") component light by a dichroic mirror (not illustrated). The divided G component light, R component light, and B component light pass through a polarization beam splitter (not illustrated) and are supplied to the liquid crystal panel 113.

The panel driving unit 114 generates a driving signal for driving the liquid crystal panel 113, based on a control signal from the control unit 109 and an image signal output from the image signal output unit 110.

Polarization of each of the G component light, R component light, and B component light is controlled by the liquid crystal panel 113 provided for each component light according to a driving signal for each component light from the liquid crystal panel driving unit 114. Thereafter, the G component light, R component light, and B component light return to the polarization beam splitter and are divided into light to be supplied as projection light to an X-prism (not illustrated) and light to return to the direction of the light source depending on the polarization state.

The X-prism synthesizes the G component light, R component light, and B component light and supplies the synthesized light to the projection lens 115.

The lens driving unit 116 adjusts the focus and zoom magnification of the projection lens based on a control signal from the control unit 109. The projection lens 115 projects the supplied synthesized light onto the screen 117 at an arbitrary magnification to display an image.

Figure 2:
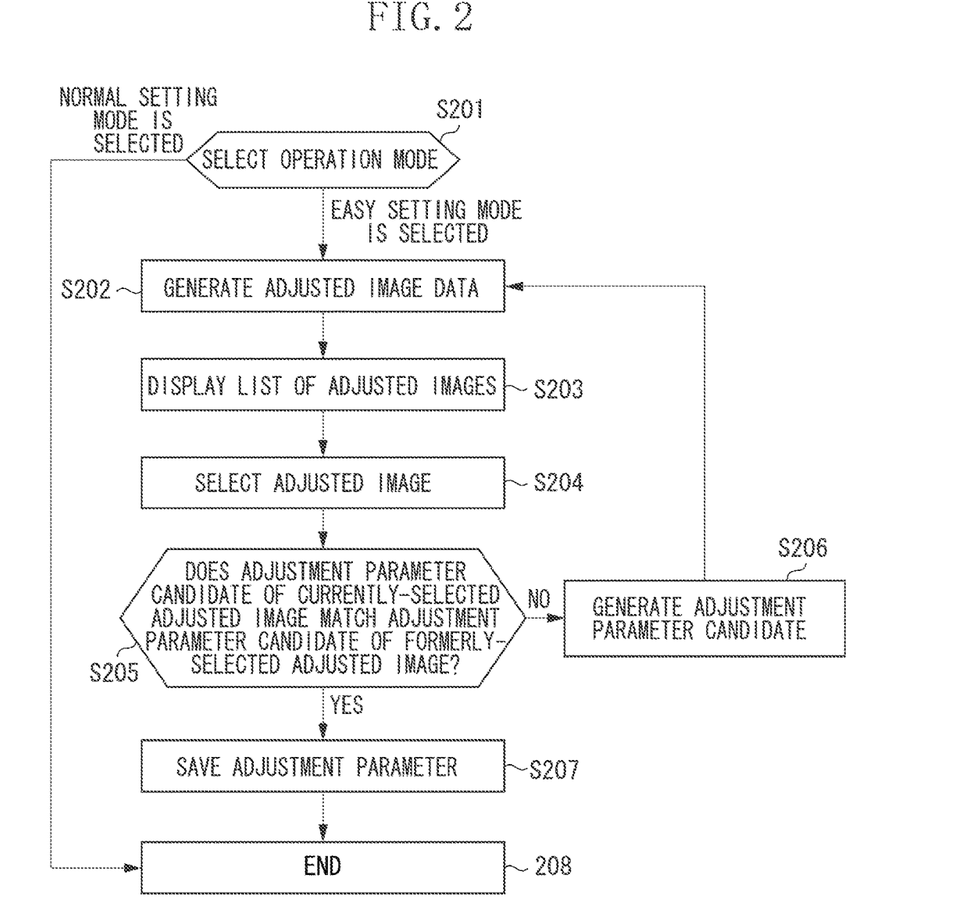
FIG. 2 is a flow chart illustrating an adjustment parameter setting according to a first exemplary embodiment.

A first exemplary embodiment will be described below. FIG. 2 illustrates a flow of a process for setting an adjustment parameter according to the first exemplary embodiment of the present invention.

Figure 3:
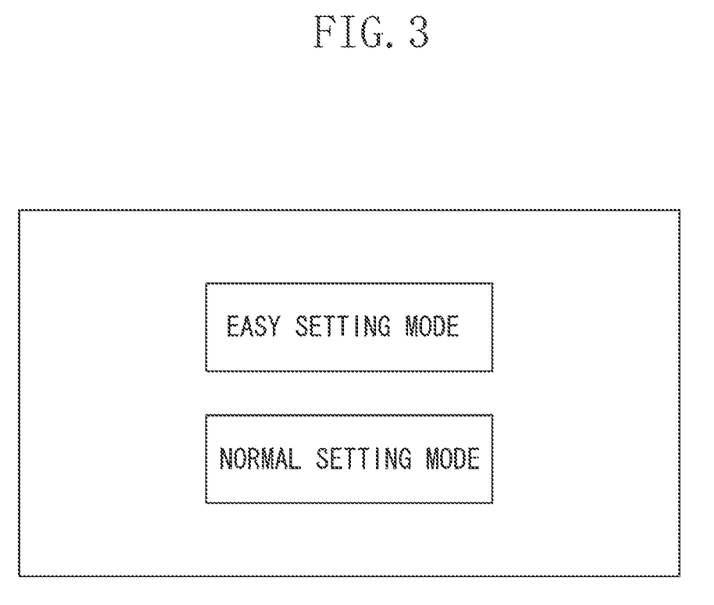
FIG. 3 illustrates an example of an initial screen for selecting an operation mode.

In step S201, an operation mode is selected based on a user operation input from the user operation input unit 108. For example, as illustrated in FIG. 3, a menu from which "Easy setting mode" or "Normal setting mode" is selectable is displayed on the screen to prompt the user to select a mode for the adjustment.

If the normal setting mode is selected, the processing proceeds to step S208, which is an end step. In step S208, the menu display is deleted, and the processing is ended. Thereafter, various settings can be performed from a conventional setting menu.

On the other hand, if the easy setting mode is selected, the processing proceeds to step S202. In step S202, adjusted image data is generated. An adjustment parameter candidate is set to the image signal processing unit 103 from the control unit 109, and a display image such as a test pattern stored in advance in the second storage unit 105 is transmitted to the image signal processing unit 103. Then, an adjusted image is generated based on the set adjustment parameter candidate and then stored in the first storage unit 104. Thereafter, the adjustment parameter candidate is changed, and the same processing is repeated, whereby a plurality of adjusted images based on different adjustment parameter candidates can be generated and stored in the first storage unit 104.

When the processing in step S202 is performed for the first time, an adjustment parameter candidate stored in advance in the second storage unit 105 is used. For the second and subsequent times, a generated adjustment parameter candidate described below is used.

For example, in a case where an adjustment range is 0 to 40, a setting range of the adjustment parameter candidate stored in advance has a median value of 20, which is an intermediate value of the adjustment range, a maximum value of 30, which is an intermediate value of the intermediate and maximum values of the adjustment range, and a minimum value of 10, which is an intermediate value of the intermediate and minimum values of the adjustment range.

Figure 4:
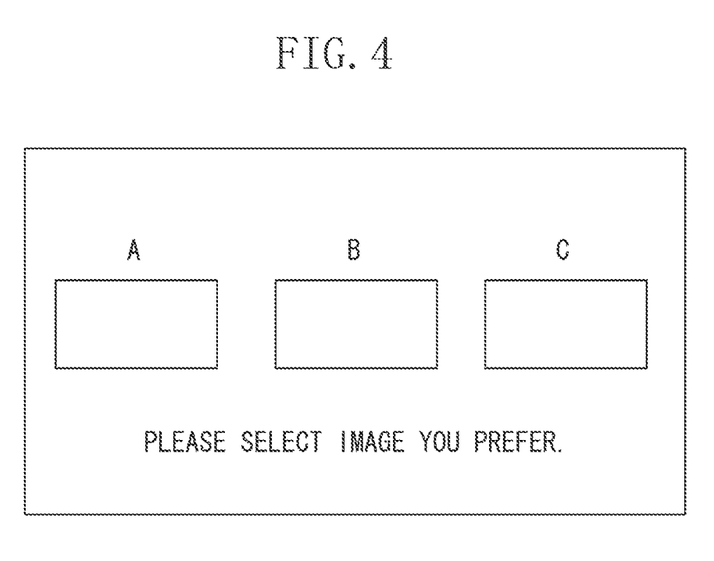
FIG. 4 illustrates a display example of a list of image data with changed adjustment parameters.

Then, the processing proceeds to step S203. In step S203, a list of the plurality of adjusted images generated in step S202 is displayed. The control unit 109 sequentially transmits the plurality of adjusted images stored in the first storage unit 104 to the image signal output unit 110, whereby the list of adjusted images based on different adjustment parameter candidates is displayed as illustrated in FIG. 4.

Then, the processing proceeds to step S204. In step S204, the user selects a preferred adjusted image. The user is prompted to select an adjusted image that suits the user preference from the list of adjusted images generated based on different adjustment parameter candidates as illustrated in FIG. 4. The user selects a preferred adjusted image from the list of adjusted images and inputs the selected adjusted image by use of the user operation input unit 108.

Then, the processing proceeds to step S205. In step S205, it is determined whether the adjustment parameter candidate of the currently-selected adjusted image matches an adjustment parameter candidate of a formerly-selected adjusted image. The adjustment parameter candidate of the formerly-selected adjusted image that is stored in the first storage unit 104, which will be described below, is compared with the adjustment parameter candidate set to the adjusted image selected in step S204. If the adjustment parameter candidates match (YES in step S205), the processing proceeds to step S207. On the other hand, if the adjustment parameter candidates do not match (NO in step S205), the processing proceeds to step S206.

Further, if the setting range of the adjustment parameter candidate of the current adjusted image is the same as the resolution of the adjustment range, it is not possible to further divide the setting range of the adjustment parameter candidate. In this case, it is determined that the adjustment parameter candidate of the currently-selected adjusted image matches the adjustment parameter candidate of the formerly-selected adjusted image, and the processing proceeds to step S207.

Figure 5:
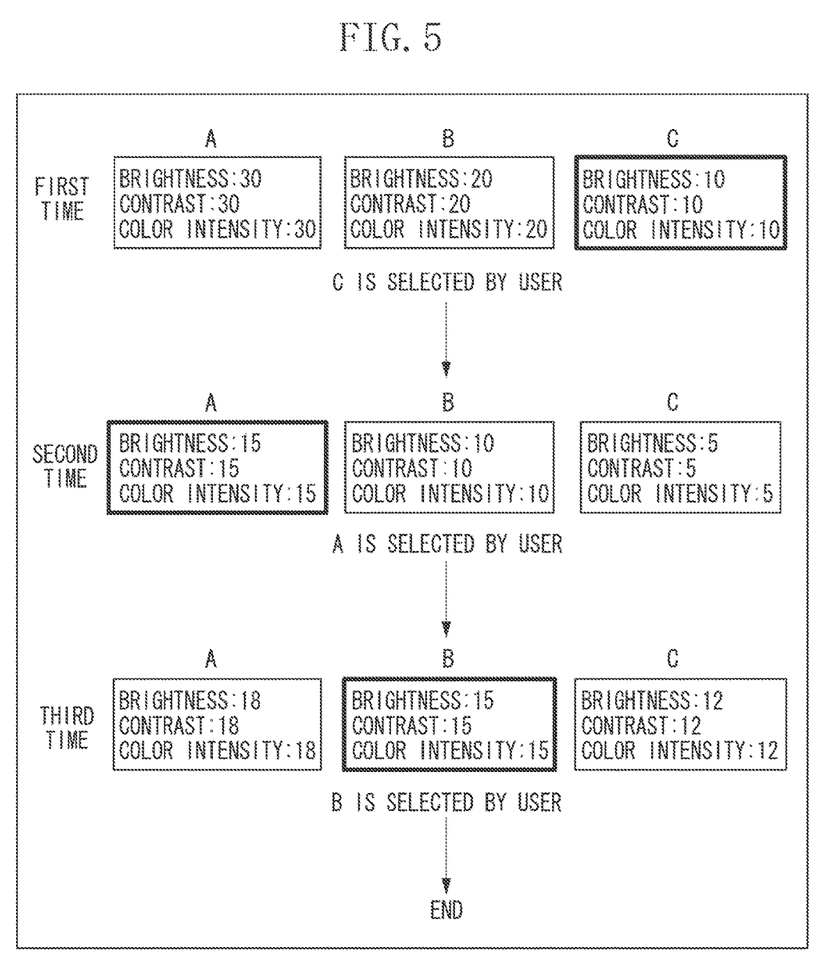
FIG. 5 illustrates an example of adjustment parameters to be set.

In step S206, an adjustment parameter candidate is generated. For example, in a case where the adjusted images of the adjustment parameter candidates illustrated in the section "First time" in FIG. 5 are displayed and the adjusted image "C" is selected by the user, an adjustment parameter candidate to be set next is generated based on the adjustment parameter candidate value of the selected adjusted image "C," i.e., 10, and the setting range of ±10. In the present exemplary embodiment, 10, which is the adjustment parameter candidate value of the selected adjusted image "C," is set as the median value, and the user preference exists near the selected adjustment parameter candidate. Therefore, the adjustment parameter candidate is generated within a narrower setting range than the setting range of the first time, for example, ±5, which is a half of the setting range of the first time. At the same time, the adjustment parameter candidate of the selected adjusted image is stored in the first storage unit 104.

After the adjustment parameter candidate is generated, the processing returns to step S202 again, and an adjusted image is generated based on the generated adjustment parameter candidate and displayed in the list. Next, in step S204, for example, the adjusted image "A" is selected by the user as illustrated in the section "Second time" in FIG. 5. In this case, in step S205, the adjustment parameter candidate of the formerly-selected adjusted image ("10" of the first time) does not match the adjustment parameter candidate of the currently-selected adjusted image, i.e., 15. Thus, the processing proceeds to step S206 again. As in the previous time, the median value is set to 15, which is the adjustment parameter candidate of the currently-selected A, and although a half of the setting range of the second time is ±2.5, the setting range is set to ±3 obtained by rounding ±2.5 up because the setting value in the present exemplary embodiment is an integral number. An adjustment parameter candidate is generated within the setting range.

An adjustment parameter candidate is generated again, and then the processing returns to step S202 as in the first time, and an adjusted image is generated based on the generated adjustment parameter candidate and displayed in the list. In step S204, for example, the adjusted image "B" is selected by the user as illustrated in the section "Third time" in FIG. 5. In this case, in step S205, the adjustment parameter candidate stored in the first storage unit 104 matches the adjustment parameter candidate of the currently-selected adjusted image. Thus, the processing proceeds to step S207.

In step S207, the matched adjustment parameter candidate is saved as an adjustment parameter in the second storage unit 105 and set to the image processing unit 103 as a setting for normal image display.

As described above, "the user selects a preferred adjusted image from a displayed list of adjusted images," whereby adjustment parameters suitable for the user preference can be set with ease.

As to an initial value of an adjustment parameter candidate, a setting value set to a preset image quality mode may be used as a reference.

Further, the combination of items of adjustment parameters to be adjusted is not limited to those described in the present exemplary embodiment, and one item or a combination of one or more items can be used. The setting ranges of the adjustment parameter candidates may be different from each other.

Further, the number of adjusted images to be displayed in the list may be two or more. In this case, the setting range is set, for example, as follows. The adjustment range is equally divided by a number obtained by adding one to the number of adjusted images to be displayed in the list, and the equally-divided values excluding maximum and minimum values are set as the setting range. An adjustment parameter candidate may be generated within the setting range.

A display image such as a test pattern may be input from the image signal input unit 102, the communication unit 106, or the recording medium input unit 107.

Figure 6:
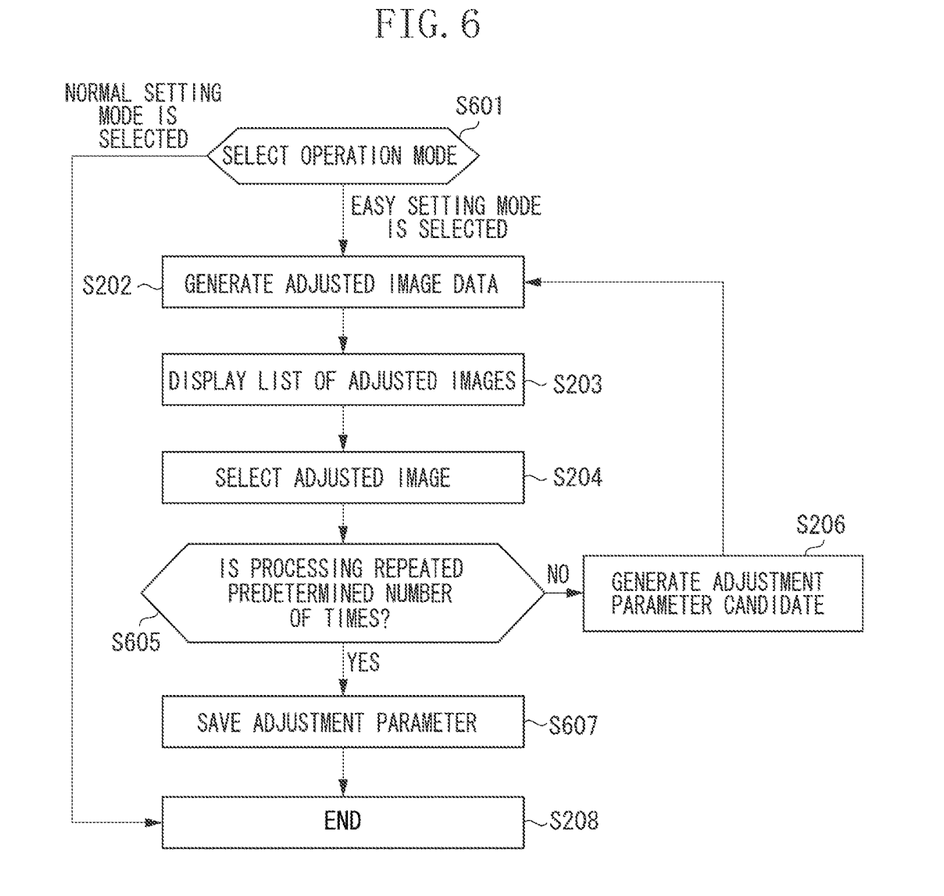
FIG. 6 is a flow chart illustrating an adjustment parameter setting according to a second exemplary embodiment.

The following describes a second exemplary embodiment. FIG. 6 illustrates a flow of a process for setting an adjustment parameter according to the second exemplary embodiment of the present invention.

The flow chart illustrated in FIG. 6 is different from the flow illustrated in FIG. 2 in that steps S201, S205, and S207 are replaced by steps S601, S605, and S607, respectively. Description of steps given the same step numbers as those in FIG. 2 is omitted.

In step S601, in addition to the function of step S201 in FIG. 2, the counted number n of times of processing that is stored in the first storage unit 104 is reset to 0.

In step S605, it is determined whether processing of steps S202 to S204 and S206 is repeated a predetermined number of times.

The counted number n of times of processing is compared with the set number N stored in advance in the second storage unit 105. If the counted number n matches the set number N (YES in step S605), the processing proceeds to step S607. On the other hand, if the counted number n does not match the set number N (NO in step S605), 1 is added to the counted number n of times of processing, and the resulting counted number n is stored in the first storage unit 104. Then, the processing proceeds to step S206.

In step S607, the adjustment parameter candidate of the last-selected adjusted image is saved as an adjustment parameter in the second storage unit 105 and set to the image processing unit 103 as a setting for normal image display.

As described above, an upper limit is set to the number of times "the user selects a preferred adjusted image from a displayed list of adjusted images," whereby an adjustment parameter that is mostly suitable for the user preference can be set while a high processing speed is realized.

Further, while the set number N is stored in advance in the second storage unit 105, the set number N may be set by a user operation.

Figure 7:
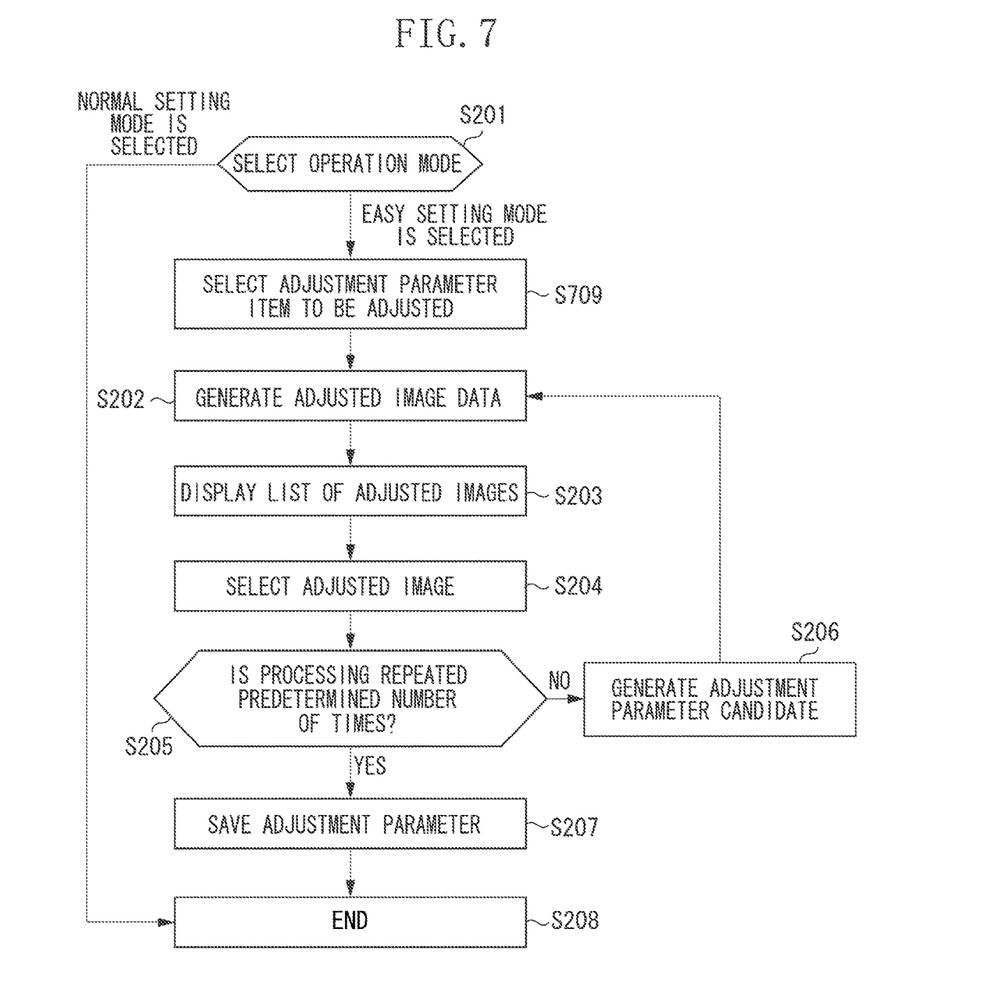
FIG. 7 is a flow chart illustrating an adjustment parameter setting according to a third exemplary embodiment.

The following describes a third exemplary embodiment. FIG. 7 illustrates a flow of a process for setting an adjustment parameter according to the third exemplary embodiment of the present invention.

The flow illustrated in FIG. 7 is different from the flow illustrated in FIG. 2 in that step S709 is added between steps S201 and S202. Description of steps given the same step numbers as those in FIG. 2 is omitted.

Figure 8:
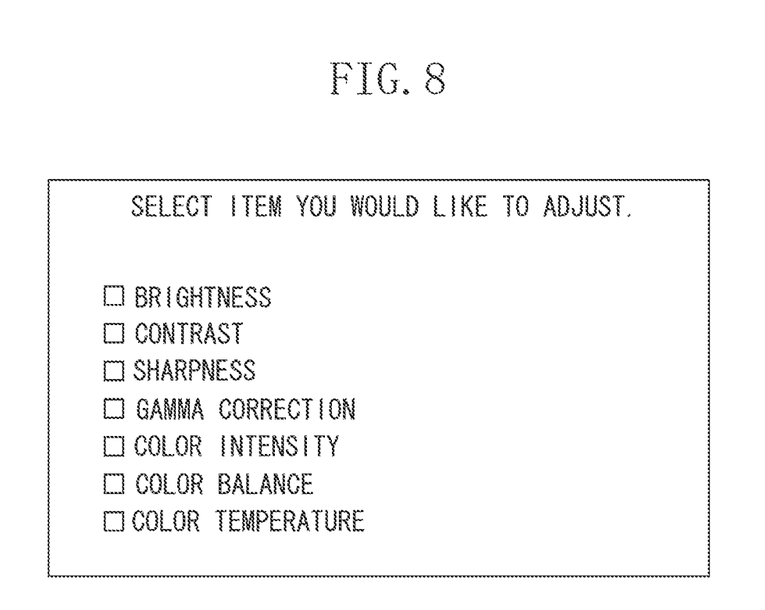
FIG. 8 illustrates an example of a screen for selecting an item to be adjusted.

In step S709, an item of an adjustment parameter to be adjusted is selected based on a user operation input from the user operation input unit 108. For example, a list of adjustable items is displayed as illustrated in FIG. 8 to prompt the user to select an item to be adjusted.

Then, processing similar to that in the first exemplary embodiment is performed with respect to the adjustment parameter candidate of the selected item, whereby setting of an adjustment parameter that the user desires to adjust can be performed.

As described above, with regard to an adjustment parameter that the user desires to adjust, "the user selects a preferred adjusted image from a displayed list of adjusted images," whereby an adjustment parameter suitable for the user preference can be set with ease.

While the foregoing describes various exemplary embodiments of the present invention, the present invention is not limited to the described exemplary embodiments and can be modified or altered in various ways within the spirit of the invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A method comprising:
   displaying a plurality of images as a first group of images;
   making a user to select a first image from the first group of images;
   displaying a plurality of images including the first image selected by the user as a second group of images;
   making a user to select a second image from the second group of images; and
   displaying a plurality of images as a third group of images including the second image selected by the user in a case where the first image and the second image are different from each other, and not displaying the third group of images in a case where the first image and the second image are same.

2. The method according to claim 1, wherein each image of the group of images includes information with regard to the each image that is different with each other.

3. The method according to claim 1, wherein in a case where the first image and the second image are same, information with regard to the first image or information with regard to the second image is stored.

4. The method according to claim 1, wherein in a case where the third group of images is displayed, display of a plurality of images including the selected image as a group of images and a processing to make a user to select an image from the group of images is repeated, and the group of images including the selected image is not displayed.

5. The method according to claim 1, wherein in a case where the first image and the second image is same, the first image or the second image is determined as a selected image.

6. A non-transitory computer readable storage medium storing a program that causes a computer to perform a method, the method comprising:
   displaying a plurality of images as a first group of images;
   making a user to select a first image from the first group of images;
   displaying a plurality of images including the first image selected by the user as a second group of images;
   making a user to select a second image from the second group of images; and
   displaying a plurality of images as a third group of images including the second image selected by the user in a case where the first image and the second image are different from each other, and not displaying the third group of images in a case where the first image and the second image are same.

7. The non-transitory computer readable storage medium according to claim 6, wherein each image of the group of images includes information with regard to the each image that is different with each other.

8. The non-transitory computer readable storage medium according to claim 6, wherein in a case where the first image and the second image are same, information with regard to the first image or information with regard to the second image is stored.

9. The non-transitory computer readable storage medium according to claim 6, wherein in a case where the third group of images is displayed, display of a plurality of images including the selected image as a group of images and a processing to make a user to select an image from the group of images is repeated, and the group of images including the selected image is not displayed.

10. The non-transitory computer readable storage medium according to claim 6, wherein in a case where the first image and the second image is same, the first image or the second image is determined as a selected image.

* * * * *